United States Patent [19]

Lee et al.

[11] Patent Number: 5,574,636
[45] Date of Patent: Nov. 12, 1996

[54] ZERO-VOLTAGE-TRANSITION (ZVT) 3-PHASE PWM VOLTAGE LINK CONVERTERS

[75] Inventors: Fred C. Lee; Hengchun Mao, both of Blacksburg, Va.

[73] Assignees: Center for Innovative Technology, Herndon; Virginia Tech Intellectual Properties, Inc.; Virginia Polytechnic Institute and State University, both of Blacksburg, all of Va.

[21] Appl. No.: 304,661

[22] Filed: Sep. 9, 1994

[51] Int. Cl.$^6$ .................................................. H02M 7/5387
[52] U.S. Cl. ........................... 363/132; 363/40; 363/138
[58] Field of Search ............................. 363/37, 40, 79, 363/127, 129, 131, 132, 138; 318/762, 803

[56] References Cited

U.S. PATENT DOCUMENTS

| | | | |
|---|---|---|---|
| 4,730,242 | 3/1988 | Divan | 363/37 |
| 4,964,483 | 9/1989 | Divan | 363/37 |
| 5,111,374 | 5/1992 | Lai et al. | 363/37 |
| 5,172,309 | 12/1992 | DeDoncker et al. | 363/132 |
| 5,412,557 | 5/1995 | Lauw | 363/37 |

*Primary Examiner*—Peter S. Wong
*Assistant Examiner*—Adolf Berhane
*Attorney, Agent, or Firm*—Whitham, Curtis, Whitham & McGinn

[57] ABSTRACT

An improved zero voltage transition (ZVT) pulse width modulation (PWM) link converter is provided which introduces a space vector modulation scheme and an auxiliary circuit which includes a commutation power supply or special switch arrangement used to discharge resonant inductor currents to zero and to recover commutation energy. In an alternate embodiment, an improved ZVT PWM link converter provides an auxiliary switch for each main switch in the converter to achieve ZVT. The novel ZVT converters provide zero-voltage switching without increasing switching action of the main switches. In this way, the advantages of PWM control is maintained. Conduction loss, turn-off losses, and voltage stress of the main switches are the same as in conventional PWM converters, but the dominant turn-on losses are eliminated, so total power losses are minimized.

7 Claims, 14 Drawing Sheets

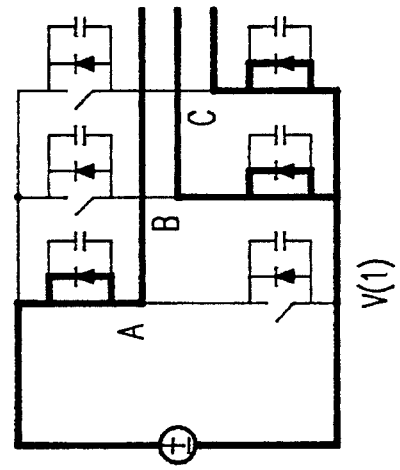
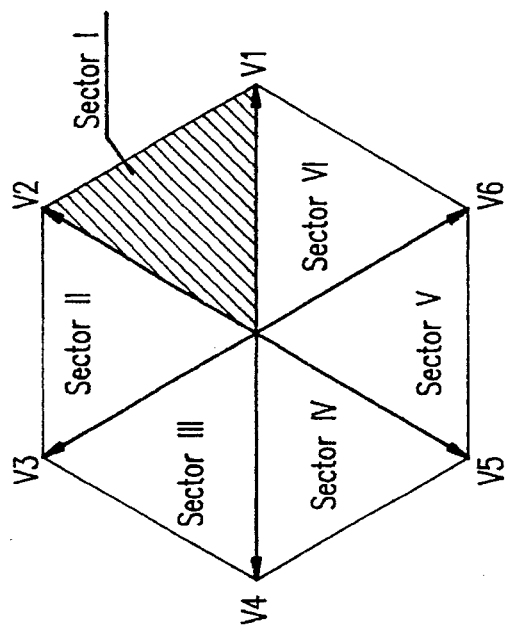
FIG.5
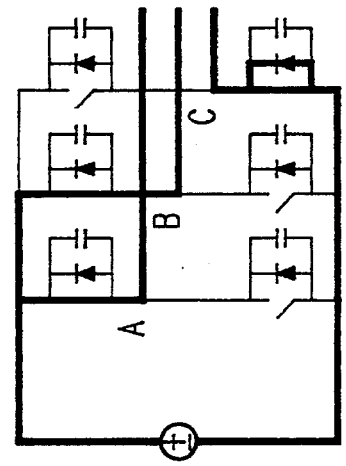
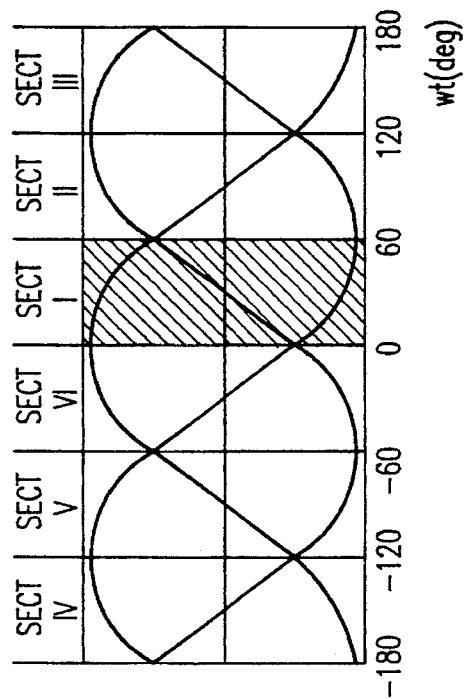
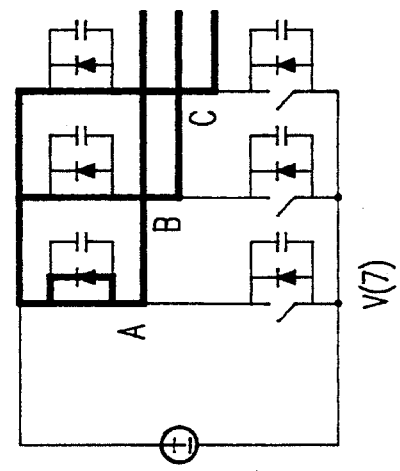
Switching Sequence: V(7)–V(2)–V(1)–V(7)–
FIG.6

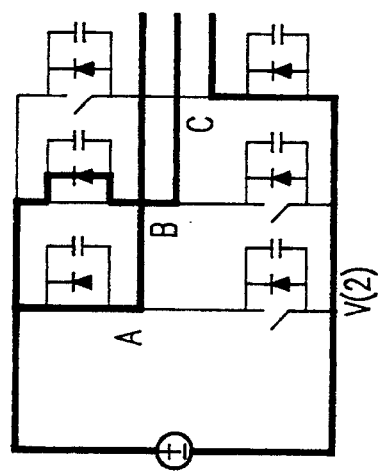
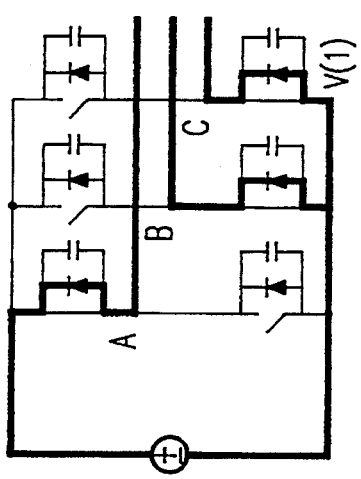
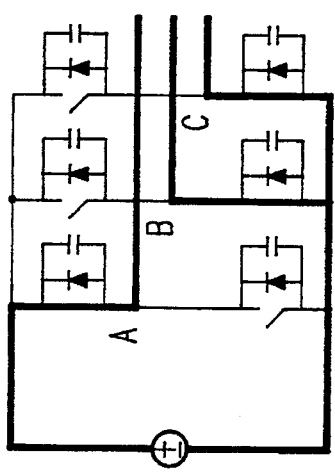
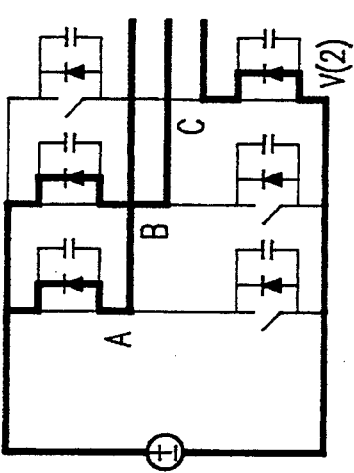
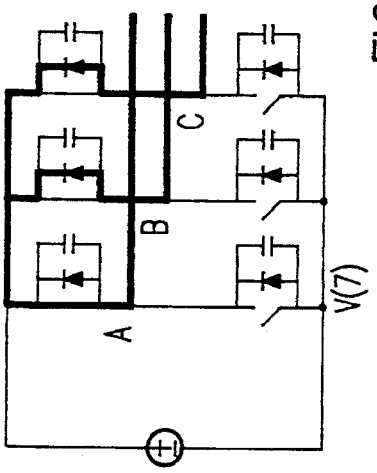
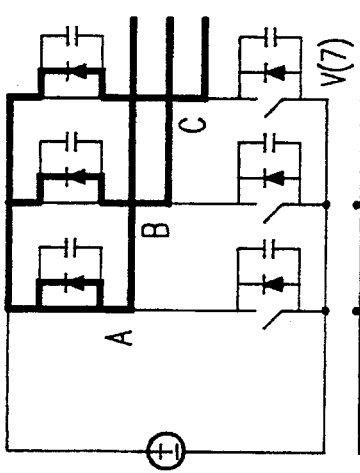
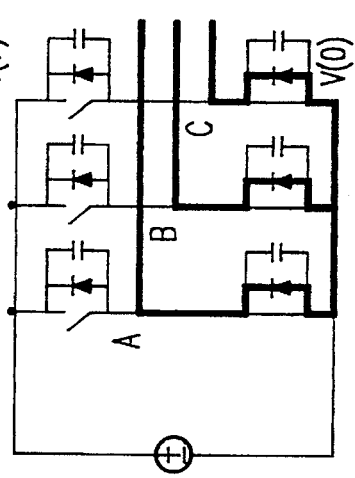
FIG.7 Switching Sequence: V(7)–V(1)–V(2)–V(7)–
FIG.8 Switching Sequence: V(7)–V(2)–V(1)–V(0)–V(1)–V(2)–V(7)–

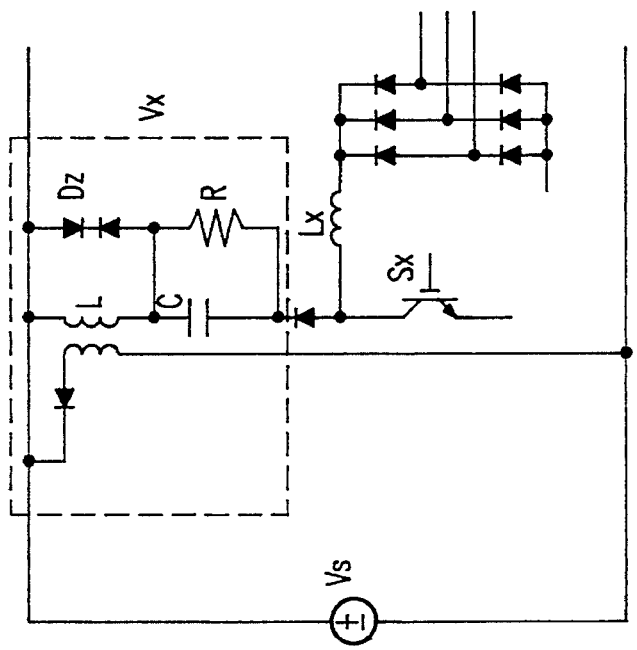
FIG.9
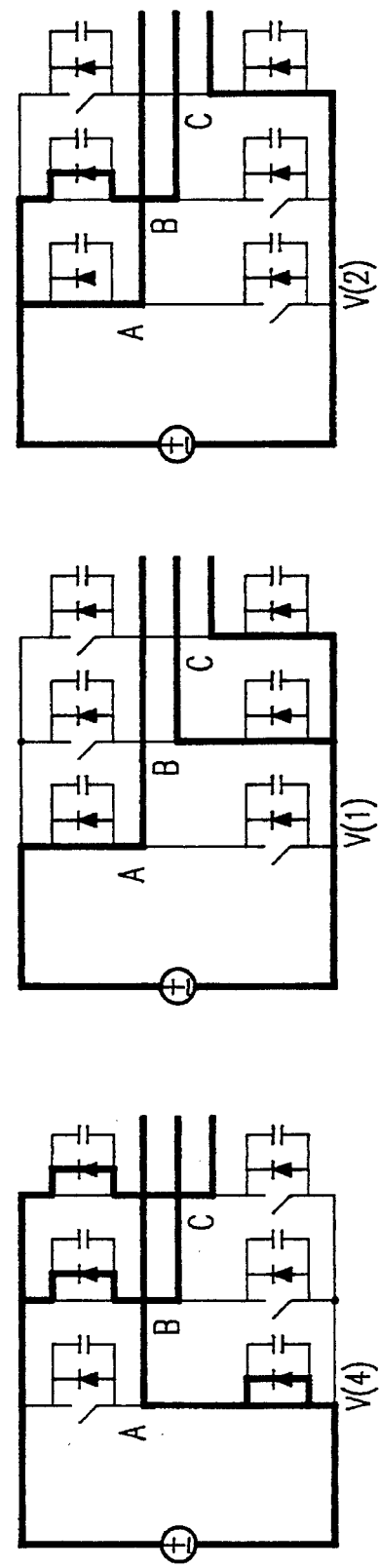
FIG.10  Switching Sequence: V(4)–V(1)–V(2)–V(4)–

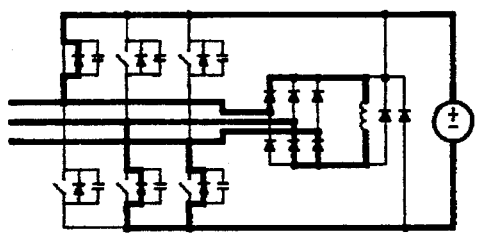 (1)
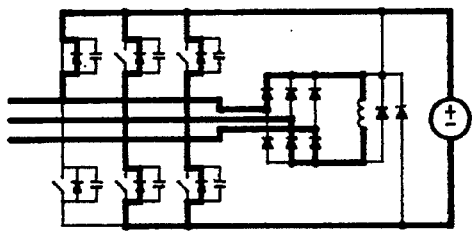 (2)
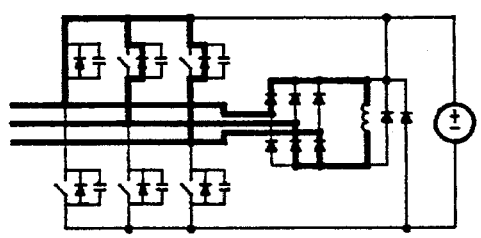 (3)
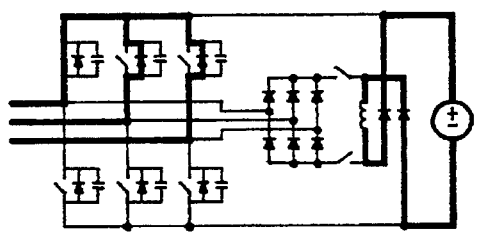 (4)
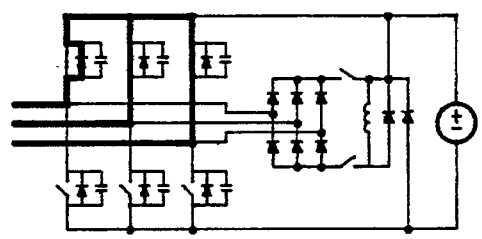 (5)
FIG.13

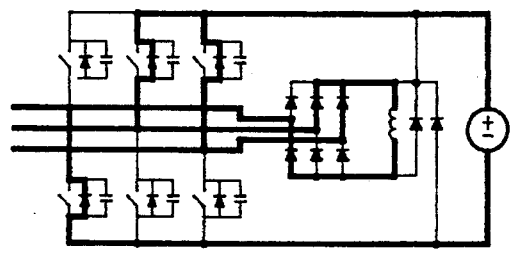
(1)
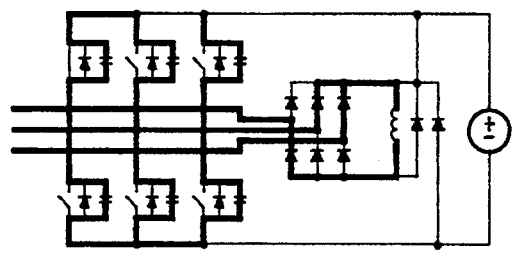
(2)
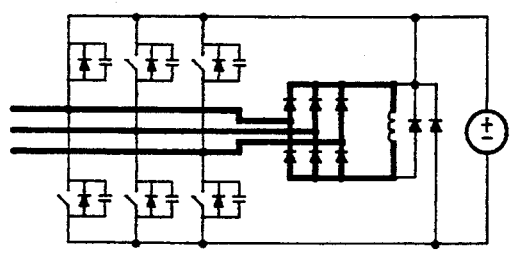
(3)
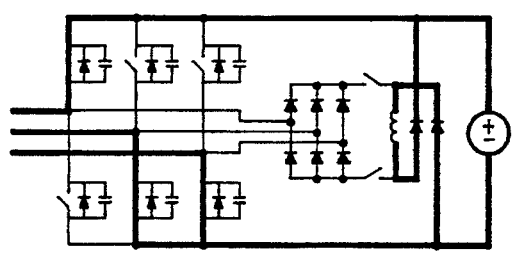
(4)
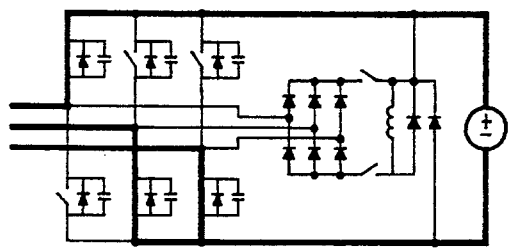
(5)
FIG.16

ZERO-VOLTAGE-TRANSITION (ZVT) 3-PHASE PWM VOLTAGE LINK CONVERTERS

BACKGROUND OF THE INVENTION

1. Field of the Invention

The present invention generally relates to zero-voltage-transition (ZVT), 3-phase voltage link converters (VLC) and, more particularly, to 3-phase voltage link converters in which ZVT can be achieved without affecting the switching modulation scheme of the main power switches.

2. Description of the Prior Art

Three-phase PWM voltage link converters (VLC), including voltage source inverters (VSI), boost rectifiers and voltage source active power filters, are widely used in medium to high power conversion and power conditioning systems. FIG. 1 shows an example of a prior art three-phase VLC. To achieve high performance, low weight, and small size, a high switching frequency is preferred. Unfortunately, high frequency operation seeds severe problems, including, excessive switching losses, diode reverse recovery, and high dV/dt in the load. These problems reduce circuit efficiency, produce high EMI emission, and can cause premature failure of isolation material in electric motors connected to the VLC. To avoid the problems associated with high frequency switching, the switching frequency of most conventional VLC's is usually held below 10 KHz in most high power applications.

It is recognized that high switching frequency losses stem mainly from an abrupt voltage change experienced in the VLC when the active switch turns on. In recent years soft switching techniques, such as zero voltage switching (ZVS), have been developed to reduce switching losses and allow higher switching frequencies to be used. There are many advantages to using ZVS in VLCs. ZVS practically eliminates diode reverse recovery, switch turn-on losses, and allows the use of larger capacitor snubber to reduce switch turn-off losses and dV/dt in output voltage.

Much research effort has been spent on implementing soft switching techniques of VLC in recent years and several ZVS topologies have been proposed. Since most ZVS problems stem from the "stiff" DC bus voltage, most of the ZVS topologies try to "soften" the voltage source by inserting an interface circuit between voltage source and bridge switches. The interface circuit resonates the DC bus voltage to zero before switch turn-on to obtain zero voltage switching. This is the basic concept of DC Link Commutation, used in, for example, resonant DC link inverters (RDCLIs). Although switching losses can be reduced in RDCLIs due to zero voltage switching, other problems have been created such as, for example, high circulating energy, high switch voltage stress, and poor PWM control resolution.

ZVS circuit topologies are known which possess full range PWM control capability. However, the soft switching of inverter switches in these topologies is achieved by an abrupt turn-off of an auxiliary switch on the DC bus. Since this DC bus switch is in the main power path, considerable conduction loss and turn-off loss are introduced. Also, the synchronization of switch turn-on in these topologies results in non-optimum PWM scheme. To remedy these problems a ZVS rectifier with a DC rail diode, which helps to realize DC link soft switching has been introduced in the art. The DC rail diode scheme is very effective but has the disadvantage that it renders the ZVS rectifier only to provide unidirectional power conversion.

A common disadvantage of DC link commutation converters is that some auxiliary device has to be put in the main power path. This can be overcome by putting the soft switching circuit on the AC side of VLC. The normal operation of the AC-side-commutation converters is quite similar to that of their PWM counterparts. The soft switching circuit is active only at the short commutation transient from diodes to switches. This concept is the same as Zero-Voltage Transition (ZVT) technique in DC—DC converters.

Two ZVT topologies include an auxiliary resonant commutated inverter (ARCPI) and a 3-phase ZVT PWM rectifier/inverter as shown in FIG. 2 and FIG. 3, respectively. A major concern is how to simplify the auxiliary circuit 10, and to avoid the extra turn-off loss in the previous three-phase ZVT PWM rectifier/inverter.

In the case of the ARCPI, shown in FIG. 2, the concept of AC side commutation is utilized. This inverter can be controlled according to any PWM scheme with some special switching arrangement for ZVT transition. The operation of soft switching is independent in every phase. Suppose $D_1$ (the parallel diode of $S_1$) is conducting and $S_2$ should be turned on. The ZVT commutation proceeds as follows:

a) At the beginning, $S_1$ and $S_{xa}$ are turned on. Then resonant inductor $L_{xa}$ will be charged through $D_1$;

b) When the inductor current reaches load current of Phase A, $D_2$ is turned off naturally;

c) When the inductor current equals load current plus a "trip" current, $S_1$ is turned off, and the resonance between $L_a$ and the capacitance of node A begins;

d) When the node voltage V(A) resonates to negative bus voltage, $D_2$ starts conducting and $S_2$ can be turned on under zero voltage. After this, $L_{xa}$ is discharged and its current decreases towards zero;

e) $S_{xa}$ is turned off when its current reaches zero; then the ZVS commutation is completed.

ARCPIs have the advantage that auxiliary switches 14 ($S_{xa}$, $S_{xb}$, and $S_{xc}$) need only withstand half of the DC bus voltage and are turned off under zero current condition. However, six auxiliary switches are required and usually not cost effective except in very high power applications.

The ZVT converter shown in FIG. 3 attempts to overcome the drawback of the ARCPIs shown in FIG. 2. The ZVT converter shown in FIG. 3 uses only one auxiliary switch $S_x$. However, there are some tradeoffs. The most serious being that the ZVT converter cannot operated when three high side switches or three low side switches in the power stage 12 are conducting (i.e. in a zero voltage vector), because no voltage is applied at the ZVT circuit input. To overcome this limitation, a space vector modulation (SVM) scheme has been modified so that the commutation from diodes $D_1$–$D_6$ into active switches occurs in all three phases at the same time. For example, if the current in phase A is flowing into the bridge and phase B and phase C currents are flowing out of bridge, then the only turn-on commutation is from $D_1$, $D_4$, $D_6$ to $S_2$, $S_3$, $S_5$. The commutation process is divided into the following steps:

a) At the beginning of the commutation, $S_x$, $S_1$, $S_4$, and $S_6$ are turned on, so resonant inductor are charged by $V_i$;

b) Just as in ARCPI, when resonant inductor currents ($L_a$, $L_b$, and $L_c$) reach certain values, $S_1$, $S_4$ and $S_6$ are turned off, so the resonant inductor resonate with the node capacitances (A, B, and C);

c) After all three node voltages (A, B, and C) resonate to opposite rails, $S_2$, $S_3$ and $S_5$ can be turned on under zero voltage condition. The resonant inductor ($L_a$, $L_b$, and $L_c$) are discharged by $V_i$ in this operation mode;

d) Before any resonant inductor current decreases to zero, the lone switch $S_x$ is turned off. The remaining currents in the resonant inductor continue to be discharged through feedback diodes 16 to zero;

e) After the three resonant inductor currents reach zero, the ZVT commutation is completed, and the converter resumes its normal operation as a conventional PWM converter.

A serious drawback of the aforementioned topologies is that more switching action of the main switches is required to ensure the ZVS condition. As a result, more turn-off losses and control complexity are introduced, thereby limiting efficiency.

SUMMARY OF THE INVENTION

It is therefore an object of the present invention to provide an improved zero voltage transition (ZVT) pulse width modulation (PWM) voltage link converter (VLC);

It is yet another object of the present invention to provide a ZVT PWM link converter which can provide zero voltage switching without increasing the switching of the main switches in the converter power stage;

It is yet another object of the present invention to provide a novel circuit topology to recover commutation energy and to discharge resonant inductor currents to zero at the end of each cycle.

According to the invention, in a first embodiment, an improved zero voltage transition (ZVT) pulse width modulation (PWM) link converter is provided which introduces a space vector modulation scheme and an auxiliary circuit which includes a commutation power supply or special switch arrangement used to discharge resonant inductor currents to zero and to recover commutation energy. In an alternate embodiment, an improved zero voltage transition (ZVT) pulse width modulation (PWM) link converter provides an auxiliary switch for each main switch in the converter to achieve ZVT. Both embodiments of the novel ZVT converter provide zero-voltage switching without increasing switching action of the main switches. In this way, the advantages of PWM control is maintained. Conduction loss, turn-off losses, and voltage stress of the main switches are the same as in conventional PWM converters, but the dominant turn-on losses are eliminated, so total power losses are minimized.

BRIEF DESCRIPTION OF THE DRAWINGS

The foregoing and other objects, aspects and advantages will be better understood from the following detailed description of a preferred embodiment of the invention with reference to the drawings, in which:

FIG. 5 are drawings showing the three phase voltages and voltage space vectors for a space vector modulation scheme (SVM);

FIG. 6 is a SVM scheme for the circuit shown in FIG. 5 in rectifier mode (where phase A has maximum current);

FIG. 7 is a SVM scheme for the circuit shown in FIG. 5 in inverter mode (where phase A has maximum current);

FIG. 8 is a SVM scheme for sector I shown in FIG. 6 (where phase B has the maximum current);

FIG. 9 is a commutation power supply implemented as an energy feedback circuit;

FIG. 10 is a is a SVM scheme for the circuit shown in FIG. 5 in regenerative mode (where phase A has maximum current);

FIG. 13 is ZVT commutation sub-topologies of the circuit shown in FIG. 12 in rectifier mode;

FIG. 16 is ZVT commutation sub-topologies of the circuit shown in FIG. 12 in regenerative mode;

DETAILED DESCRIPTION OF A PREFERRED EMBODIMENT OF THE INVENTION

Figure 1:
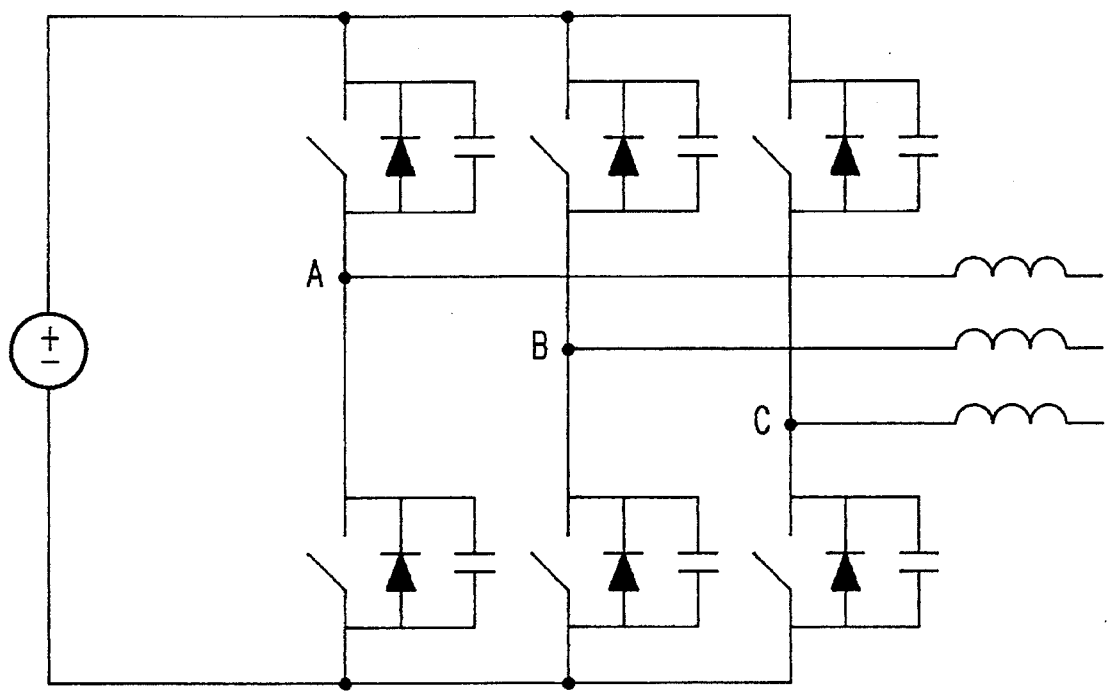
FIG. 1 is a prior art three phase voltage link converter.
Figures 2, 3, 4:
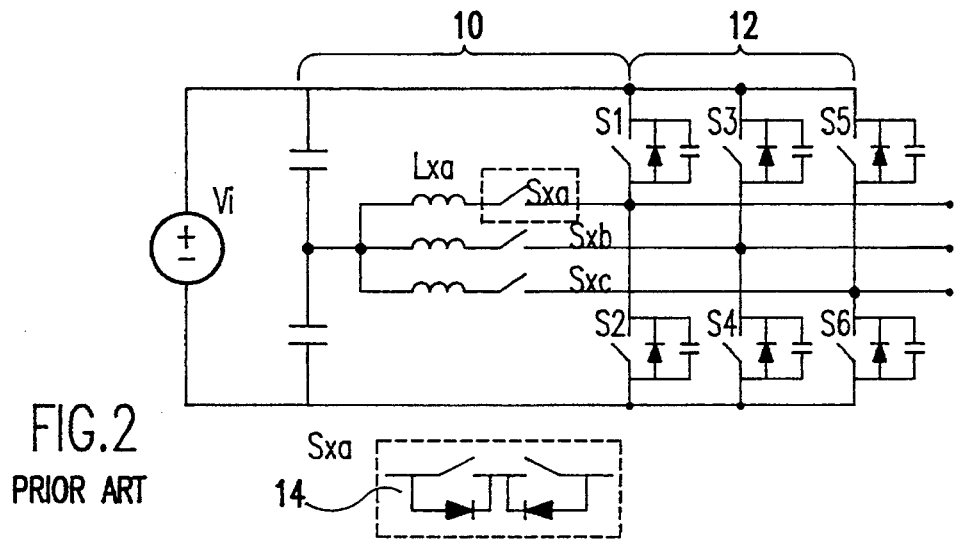
FIG. 2 is a prior art auxiliary resonant commutation pole inverter.
FIG. 3 is a prior art zero voltage transition (ZVT) pulse width modulation (PWM) rectifier/inverter.
FIG. 4 is an improved ZVT PWM voltage link converter according to the present invention.

Referring now to the drawings, and more particularly to FIG. 4, there is shown an improved ZVT PWM voltage link converter according to the present invention. To reduce converter cost, it is convenient to divide the six main switches into two groups comprising three high side switches and three low side switches. With respect to soft switching, each group can be viewed as a DC—DC converter and use a set of ZVT circuit. In the improved link converter, $S_{xd}$ is used to provide ZVS condition to the three low side switches $S_2$, $S_4$ and $S_6$, while $S_{xu}$ is used to provide ZVS condition to the three high side switches $S_1$, $S_3$ and $S_5$.

The zero voltage switching of the main switches can be achieved under any circumstances, and the control of the converter can be implemented according to any appropriate PWM scheme. Since voltage space vector modulation (SVM) has the advantages of high output voltage, low harmonic distortion, low switching power losses, and easy microcomputer implementation, SVM-based control is preferred. To reduce the actuation of the commutation circuit 20, a modified space vector PWM scheme can be utilized to synchronize the main switch turn-on ($S_1$–$S_6$) when possible. This scheme changes switching sequences according to the relative magnitude of phase currents. Take inverter operation as an example. Supposing the reference voltage space vector is in the 60° period of Sector I shown in FIG. 5, SVM schemes is as follows:

Scheme (A): If current in phase A or Phase C is larger than currents in the other two phases, then $S_1$ or $S_6$ is closed all the time, and the other two phases work in PWM operation. The turn-on of the main switches is easily synchronized. Notice that this scheme also gives minimum turn-off losses of main switches, since the phase with the highest current is not switched. Taking maximum current in phase A as an example, FIG. 6 shows the modulation scheme in the rectifier mode, while FIG. 7 shows the modulation scheme in the inverter mode.

Scheme (B): If phase B has the largest current, then PWM scheme is changed back to standard voltage space vector modulation described in, for example, C. Cuadros et al., Space Vector Modulation, Zero Voltage Transition Three-Phase DC Bidirectional Converter, *Proceedings of PESC*, 1994, pp. 16–23, which is herein incorporated by reference, and no turn-on synchronization is used. The commutation circuit 20 has to be actuated more than once in a switching cycle. Because the turn-off number of the main switches is reduced to minimum, the switching losses of the main switches are also minimized.

The modulation scheme of sector I of FIG. 5 is shown in FIG. 8. If phase angle $\phi$ is smaller than 30°, then only scheme A is to be used. However, with a larger phase angle, scheme B has to be used for a time duration of ($\phi$–30°) in 60° interval. The operation of the ZVT auxiliary circuit is explained with two operation examples as follows:

Example A: $D_1$, $D_4$ and $D_6$ are conducting, and $D_4$ and $D_6$ are to be switched. This commutation is a typical turn-on commutation in the rectifier operation. The commutation takes the following steps:

(1) At the beginning of commutation, $S_{xu}$ is turned on. Resonant inductor $L_b$ and $L_c$ start to be charged linearly.

(2) When the sum of currents in $L_b$ and $L_c$ reaches the sum of phase B and phase C currents, diodes $D_4$ and $D_6$ turn off naturally. After this, $L_b$ and $L_c$ begin to resonate with node capacitances of phase B and phase C, and voltages of nodes B and C increase towards positive DC rail.

(3) When voltages of nodes B and C reach the positive DC rail, $D_3$ and $D_5$ start conduction. After this, $S_3$ and $S_5$ can be closed with zero voltage, and $S_{xu}$ can be turned off.

(4) After $S_{xu}$ is turned off, $L_b$ and $L_c$ are discharged through $D_{xu}$, commutation power supply $V_{xu}$, and DC bus voltage $V_s$.

(5) When the currents in $L_b$ and $L_c$ are discharged to zero, $D_{xu}$ and the auxiliary diode bridge turn off, and the ZVT commutation is completed.

Example B: $S_1$, $D_3$ and $D_5$ are conducting, and $D_3$ and $D_5$ are to be switched. This commutation is a typical turn-on commutation in the inverter operation. The commutation process consists of following steps:

(1) At the beginning of the commutation, $S_{xd}$ is turned on. Then resonant inductor $L_a$, $L_b$ and $L_c$ are charged linearly by the DC rail voltage source $V_s$, through $S_1$, $D_3$, and $D_5$, respectively.

(2) When the sum of currents in $L_b$ and $L_c$ reaches the sum of currents in phase B and Phase C, $D_3$ and $D_5$ turn off naturally. Resonance between $L_b$, $L_c$ and capacitance of nodes B and C starts. Voltages of nodes B and C resonate towards negative DC rail. The charging of resonant inductor $L_a$ continues until $S_{ad}$ is turned off.

(3) When voltages of nodes B and C reach the negative DC rail, $D_4$ and $D_6$ start conduction. After this, $S_4$ and $S_6$ can be closed with zero voltage, and $S_{ad}$ can be turned off.

(4) After $S_{xd}$ is turned off, $L_b$ and $L_c$ are discharged through $D_{xd}$, commutation power supply $V_{xd}$ and DC bus voltage $V_s$. Meanwhile, $L_a$ is discharged through $D_{xd}$ and commutation power supply $V_{xd}$.

(5) When the currents in $L_a$, $L_b$, and $L_c$ are discharged to zero, $D_{xd}$ and the auxiliary diode bridge turn off, and the ZVT commutation is completed.

Notice that the commutation processes in Example (A) and Example (B) are similar. The main difference is that the auxiliary current peak in Case B is higher and takes a longer time to be discharged to zero.

As exemplified above, additional commutation power supplies are used to discharge resonant inductor and recovery commutation energy. The power and voltage ratings of commutation power supply are small compared with the main circuit. This power supply can be used to power control circuit and drive circuit, or it can be implemented as an energy feedback circuit which sends the commutation energy to the DC side. FIG. 9 shows an example of a circuit for implementing the commutation power supply $V_x$ as a feedback circuit. After the main switches are turned on, $S_x$ can be turned off. The current in $L_x$ will flow through the commutation power supply $V_x$, and the energy in $L_x$ is delivered to $V_s$ through coupled inductor L. Capacitor C is used to discharge L after most of the energy in $L_x$ is sent to $V_s$ while $D_z$ and R can damp the oscillation because of leakage inductance L.

The inventive ZVT voltage link converter is very suitable for high and medium power applications because it combines the advantages of zero voltage switching and PWM control with a reasonably simple auxiliary circuit. The basic goal of the new topology is to achieve ZVS without increasing turn-off losses of the main switches in any operation mode. Described below are several variations of the topology tailored for bidirectional rectifiers and high power applications. When a boost rectifier works as a power factor correction (PFC) circuit, its power factor (pf) is always controlled close to zero, i.e. the phase angle between phase current and phase voltage is very small. Because the relation between phase current and phase voltage is quite fixed, the control and soft switching scheme can be simplified. First, the space vector PWM scheme can be implemented in a simpler way as follows:

(A) Rectifier Mode: In the rectifier mode, the phase with maximum current is clamped to DC bus all the time, and the other two phases are controlled with PWM. For example, in Sector I shown in FIG. 5, if phase A has maximum current, then $S_1$ is kept on so that $D_1$ is always conducting. $S_3$ and $S_5$ are controlled in a PWM way with their turn-on synchronized, i.e. the turn-on commutation is always from $D_4$ and $D_6$ to $S_3$ and $S_5$. With this kind of control, the turn-off losses are minimized. The SVM scheme can be exemplified by FIG. 6.

(B) Regenerative Mode: In the regenerative mode, the polarities of the three phase currents are reversed. The modulation scheme is modified to synchronize active switch turn-on in three phases, and complementary voltage vectors are used to synthesize zero vector. This is the same SVM scheme as is shown in FIG. 10 with the same conditions as in Example (A). In this mode, more switching of the main switches $S_1$–$S_6$ have been introduced, so more turn-off losses will be produced than in a normal SVM PWM converter. However, since turn-on instances of all switches are synchronized, zero voltage switching can be used more easily to reduce turn-on losses. Hence, the total switching losses in a soft switching converter are still lower than in a normal SVM PWM converter Referring now to FIG. 11, for the above SVM schemes, the ZVT circuit can be further simplified. Note that switch turn-on commutation always starts with three diodes conducting, and the diodes in one group (high side or low side) are always turned off at the same time, the resonant inductor can be shifted into the auxiliary diode bridge and combined into one $L_x$. Thus only one auxiliary switch $S_x$, auxiliary diode $D_x$, and commutation power supply $V_x$ are needed.

Figure 11:
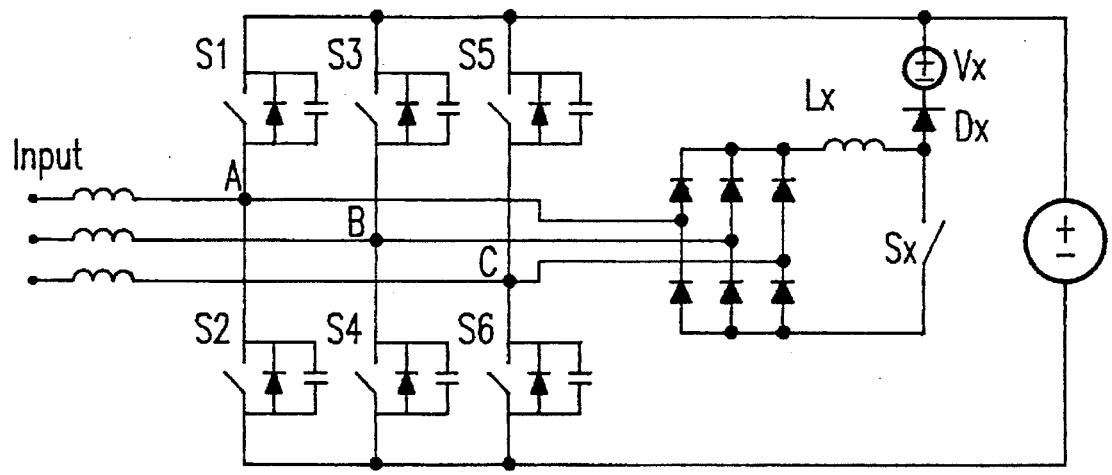
FIG. 11 is an example of a three phase PWM ZVT boost rectifier according to the present invention.
Figure 12:
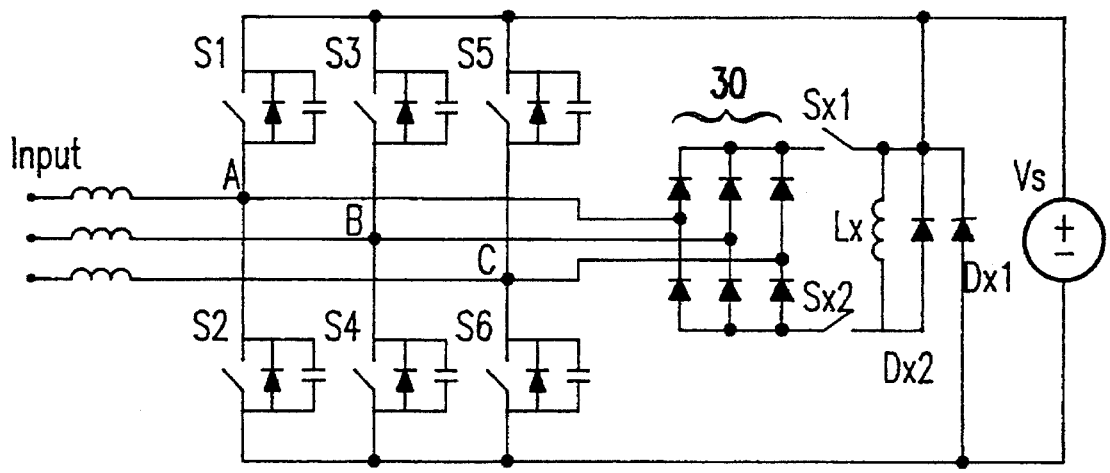
FIG. 12 is a PWM ZVT boost rectifier according to the present invention.
Figure 14:
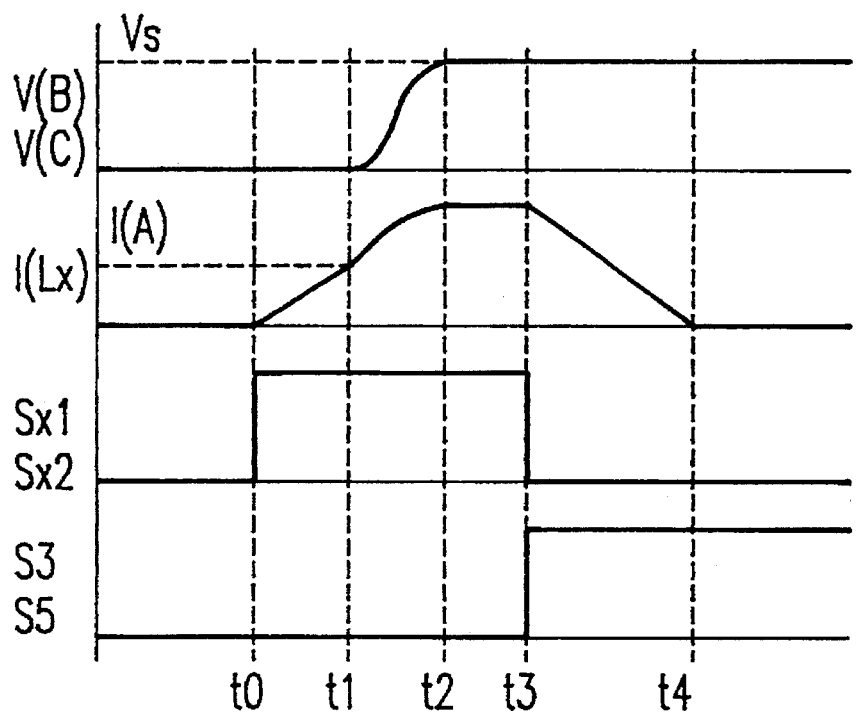
FIG. 14 is ZVT commutation waveforms for the sub-topologies shown in FIG. 13.

The topology shown in FIG. 11 works well with a the commutation power supply $V_x$. However, for some applications, it may be desirable to replace the additional commutation power supply and send commutation energy to output directly. Referring now to FIG. 12, the operation principle of this topology is exactly the same as that of FIG. 11, with the only difference of implementing $S_x$ with two switches ($S_{x1}$ and $S_{x2}$) so that $L_x$ can be discharged by $V_s$ directly at the end of the ZVT commutation. Assuming that before commutation, voltage space vector is in Sector I as is shown in FIG. 5. With the above discussed space vector modulation scheme, two types of turn-on commutation exist for the ZVT boost rectifier shown in FIG. 12:

(A) Rectifier Mode—from $D_4$ and $D_6$ to $S_3$ and $S_5$: Suppose $D_1$, $D_4$ and $D_6$ are conducting with maximum current in $D_1$ and $S_3$ and $S_4$ are to be turned on. The whole commutation process is shown in FIG. 13 and FIG. 14. Notice that switch $S_1$ is kept on during the whole commutation. The commutation process consists of the following stages:

(1) [$t_0$, $t_1$] Auxiliary switches $S_{x1}$ and $S_{x2}$ are turned on at $t_1$, so the resonant inductor $L_x$ is charged by output voltage $V_s$, and its current increases linearly.

(2) [$t_1$, $t_2$] When the current $I_{Lx}$ reaches the sum of load currents in Phase B and Phase C at $t_1$, diodes $D_4$ and $D_6$ turn off naturally and $L_x$ starts resonance with node capacitance of Phase B and C. The voltages of nodes B and C increase towards positive DC rail in a resonant manner.

(3) [$t_2$, $t_3$] When the voltages of nodes B and C reach the DC rail voltage at $t_2$, body diodes $D_3$ and $D_5$ start conduction, so the current in $L_x$ freewheels through $S_1$, $D_3$, and $D_5$. Because of the clamp action of $D_3$ and $D_5$, switch voltages of $S_3$ and $S_5$ are kept at zero.

(4) [$t_3$, $t_4$] After $t_2$, $S_3$ and $S_5$ can be turned on with zero voltage condition, therefore eliminating turn on losses and diode reverse recovery. At the same time, $S_{x1}$ and $S_{x2}$ can be turned off and the commutation energy in $L_x$ is fed into $V_s$ through $D_{x1}$ and $D_{x2}$. Meanwhile, $L_x$ is discharged by $V_s$ towards zero current.

(5) [$t_4$, $t_0$] When the resonant inductor current decreases to zero at $t_4$, $D_{x1}$ and $D_{x2}$ turns off naturally. Now the ZVT commutation is completed, and the auxiliary circuit keeps inactive until the next ZVT commutation.

Figure 15:
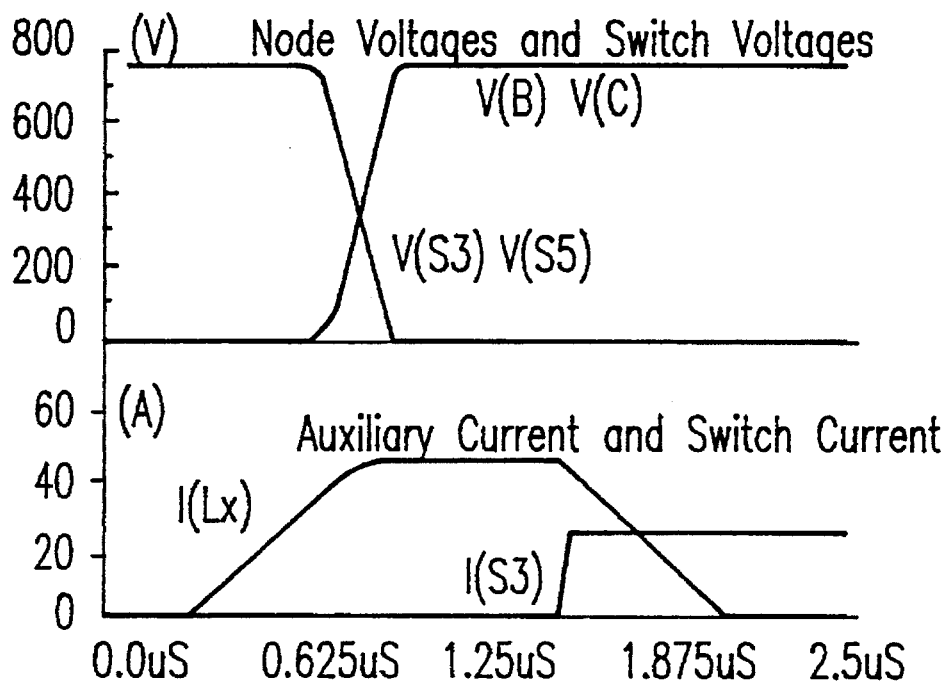
FIG. 15 is a simulation of ZVT commutation.

FIG. 15 shows simulation results of the commutation process for the circuit shown in FIG. 12 in rectifier mode. Notice that no overlap between switch voltage and switch current in $S_3$ and $S_5$ exists, so turn-on losses are eliminated completely.

Figure 17:
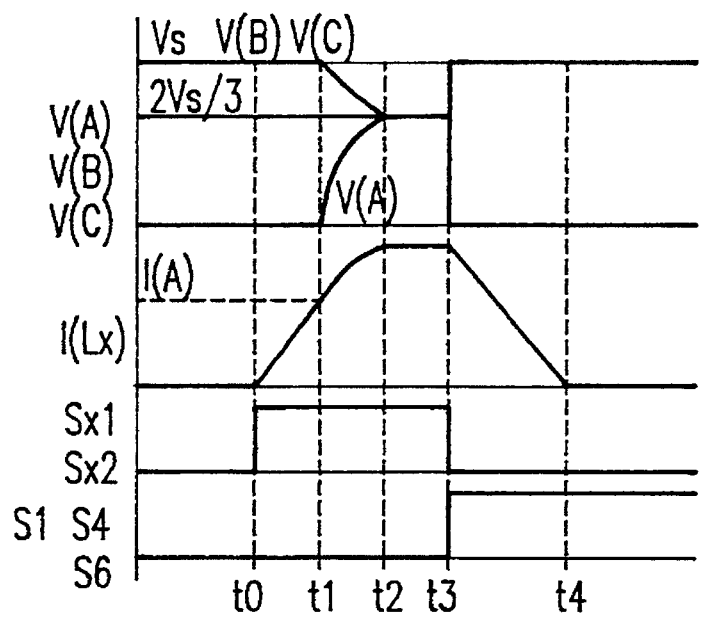
FIG. 17 are turn-on commutation waveforms for the sub-topologies shown in FIG. 16.

(B) Regenerative Mode—from $D_2$, $D_3$ and $D_5$ into $S_1$, $S_4$, and $S_6$: Suppose that the voltage space vector is still in Sector I with $D_2$, $D_3$ and $D_5$ conducting, and $S_1$, $S_4$ and $S_6$ are to be turned on. The commutation process is shown in FIG. 16 and FIG. 17 as follows:

(1) [$t_0$, $t_1$] The turn-on commutation starts with $S_{x1}$ and $S_{x2}$ being turned on at $t_0$. After auxiliary switches are turned on, $L_x$ is charged by the output voltage through the three conducting diodes, and its current increases linearly.

(2) [t1, t2] When the current $I_{Lx}$ reaches maximum load current (here phase A current), the three diodes turn off naturally, and $L_x$ starts to resonate with node capacitance of nodes A, B, and C. the three node voltages resonate towards their opposite DC rails respectively.

(3) [t2, t3] When the three node voltages become equal (in this case ⅔ of output voltage), the auxiliary diode bridge 30 is shorted and the resonance ends. The current in $L_x$ freewheels through $S_{x1}$, $S_{x2}$, and the shorted diode bridge 30.

(4) [t3, t4] After $t_2$, all diodes in the main bridge stop conducting. Also, the voltage across $S_1$ is reduced to $V_s/3$, and the voltages across $S_4$ and $S_6$ are both reduced to $2\,V_s/3$. Active switches $S_1$, $S_4$ and $S_6$ can be turned on with reduced voltages at $t_3$. At the same time, $S_{x1}$ and $S_{x2}$ should be turned off, so $L_x$ is discharged by $V_s$ through $D_{x1}$ and $D_{x2}$ in this stage.

(5) [t4, t5] When the current in $L_x$ is discharged to zero at $t_5$, $D_{x1}$ and $D_{x2}$ turn off naturally. The commutation is completed, and the auxiliary circuit keeps inactive until the turn-on commutation in the next switching cycle.

Figure 18:
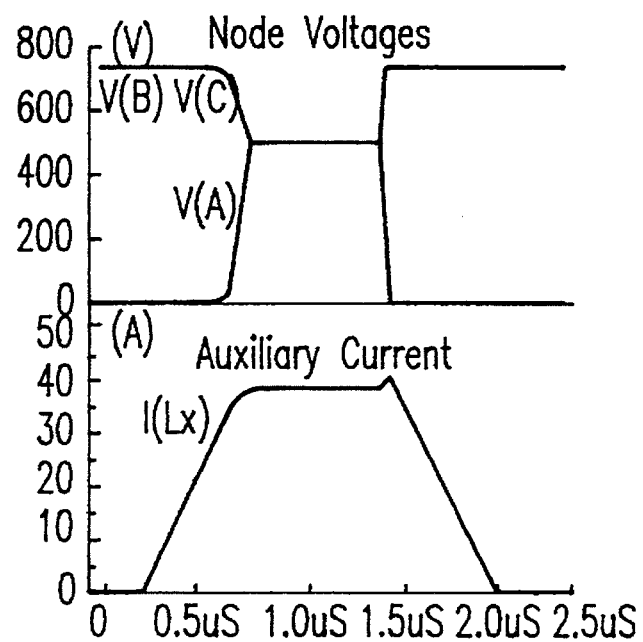
FIG. 18 is a simulation of turn-on commutation.

FIG. 18 shows simulation results for the commutation process for the circuit shown in FIG. 12 in regenerative mode. Because diode reverse recovery is eliminated and turn-on voltages are reduced, the turn-on losses are largely reduced due to the "partial" soft switching condition, so high efficiency can still be achieved in regenerative mode.

Figure 19:
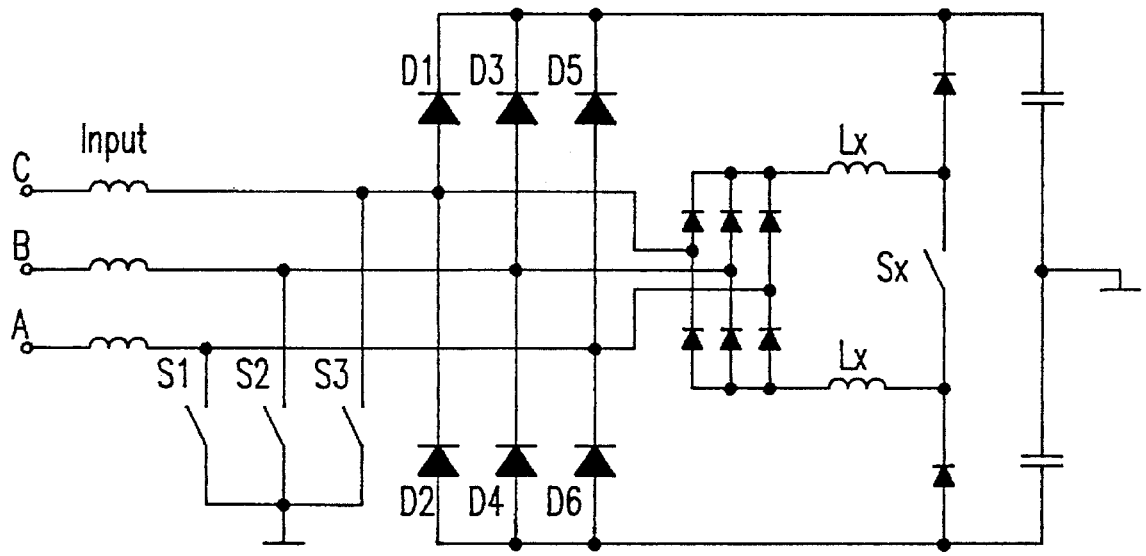
FIG. 19 is a ZVT 3-level boost converter according to the present invention.
Figure 20:
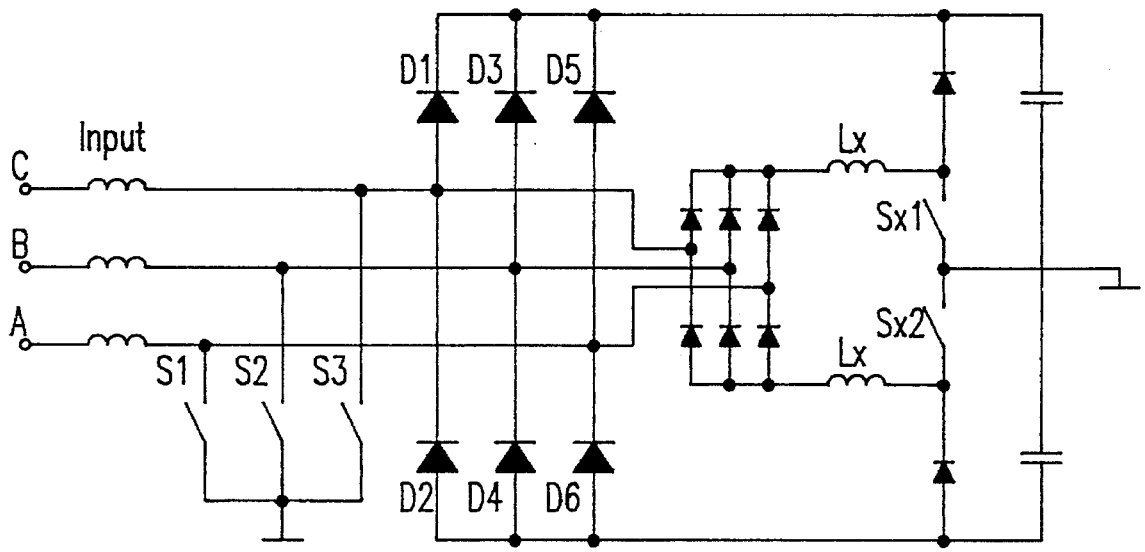
FIG. 20 is a ZVT 3-level PWM boost rectifier according to the present invention.

Referring now to FIGS. 19 and 20, the above concept can be extended to a three-level boost rectifier. The main advantage of three-level rectifier is that the voltage rating of active switches can be reduced compared to conventional boost rectifiers. Also, its control can be implemented as three independent phase controllers with turn-on instances synchronized in three phases. The ZVT circuits work in a similar way to that in FIG. 12 operating in regenerative mode. Before turn-on of the main switches, $S_1$, $S_2$, and $S_3$, auxiliary switches ($S_x$ in FIG. 19 or $S_{x1}$ and $S_{x2}$ in FIG. 20) are turned on. The resonant inductor $L_x$ will be charged through the conducting diodes $D_1$–$D_6$. After the current in $L_x$ reaches load current, the diodes $D_1$–$D_6$ will turn off softly, thus eliminating the reverse diode recovery problem. After this, the voltages across the main switches can be resonated to zero by $L_x$ and so to allow $S_1$–$S_3$ to turn on with zero voltage. Thereafter, the auxiliary switches are turned off and the energy in $L_x$ is delivered to the output through feedback diodes 41. The operation of the circuits shown in FIGS. 19 and 20 is very similar except that the auxiliary switches in FIG. 20 need only withstand only half output voltage, making the circuit very attractive for high voltage applications. Note that the control of each main switch can be the same as in a single phase boost rectifier.

Figure 21:
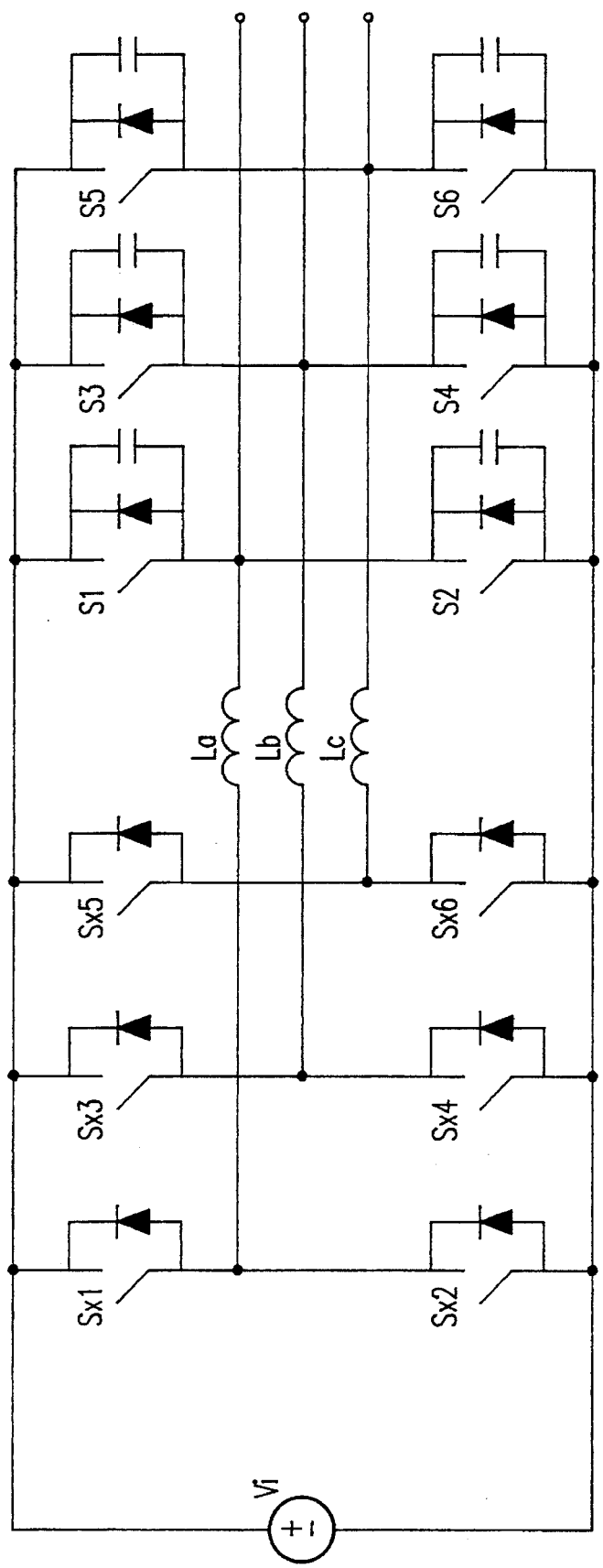
FIG. 21 is a ZVT PWM voltage link converter for high power applications having an auxiliary switch for each main switch in the converter.

Referring now to FIG. 21, there is shown an alternate embodiment of the present invention. In the first embodiment, auxiliary switches and additional commutation power supply means are used to discharge resonant inductors and recovery commutation energy. In some high power applications the auxiliary power supplies may be eliminated by using additional auxiliary switches; one for each main switch. In this case, the topology shown in FIG. 21 can be used. Compared with the auxiliary resonant commutation pole inverter (ARCPI), the operation and auxiliary switch count of the new topology is similar but has the significant advantage in that the resonant inductor current no longer needs to be charged higher than load current, Hence, no extra main switch switching is necessary to achieve ZVS turn-on and no extra current peak in auxiliary switch is experienced. Also, the control timing in ZVT transition is not critical because zero voltage condition can be maintained as long as desired.

Figure 22:
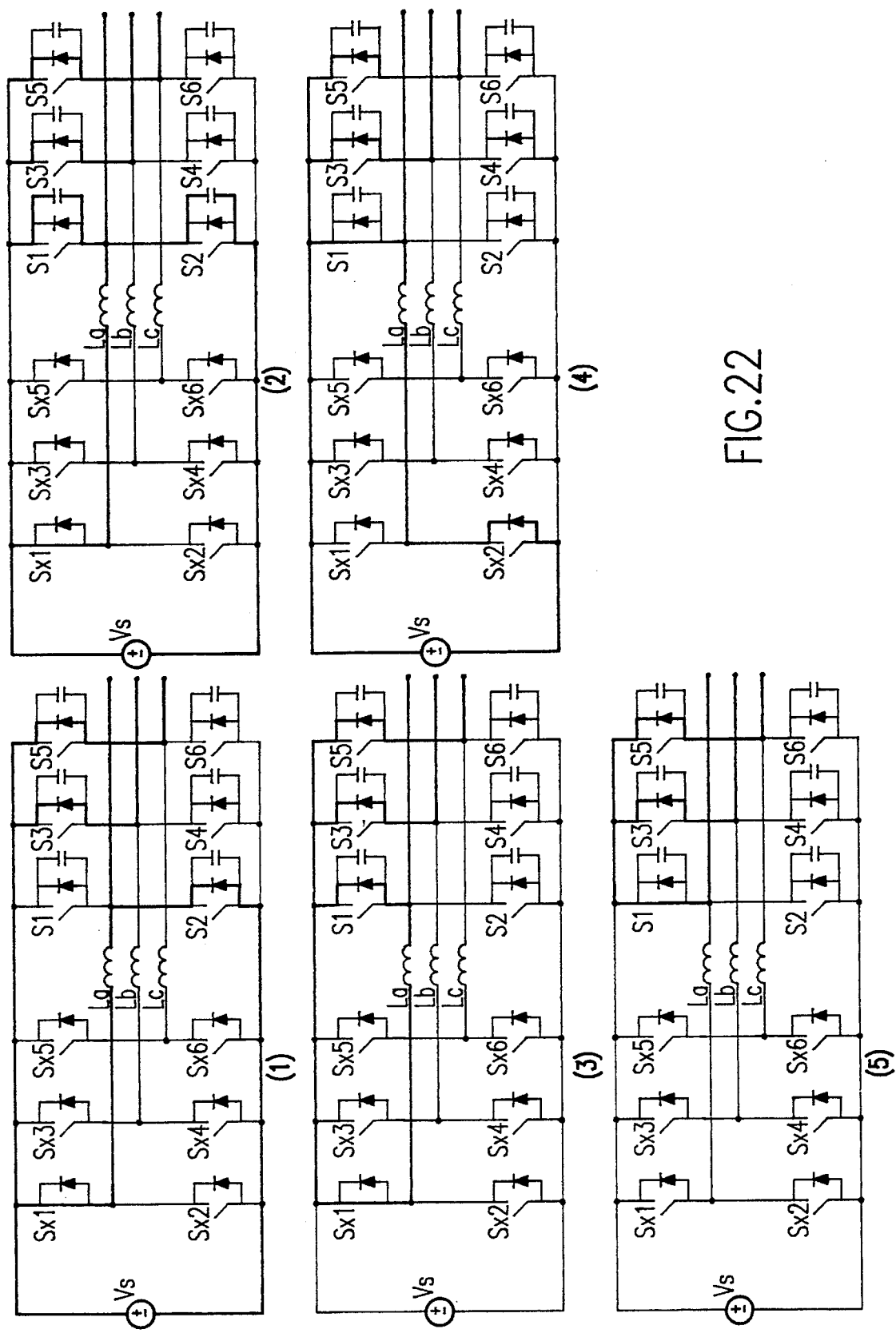
FIG. 22 is sub-topologies of the circuit shown in FIG. 21 for a commutation from $D_2$ to $S_1$.

The ZVT commutation of this topology is independent for every active switch and its control is almost the same as in ZVT DC—DC boost converter. For example, if $D_2$ is conducting and is to be switched, then the ZVT commutation is shown in FIG. 22 and will take the following steps:

(1) $S_{x1}$ is turned on at the beginning of commutation. Then the current in inductor La is charged through $D_2$, $S_{x1}$, and DC link voltage.

(2) When auxiliary current reaches phase A current, $D_2$ is turned off naturally. The inductor La starts resonating with node capacitance. The voltage of node A resonates towards positive DC rail.

(3) When node A voltage reaches positive DC rail, $D_1$ starts to conduct. Auxiliary current freewheels in the path of $D_1$, La and $S_{x1}$. Then $S_1$ can be turned on under zero voltage conditions, and $S_{x1}$ can be turned off.

(4) After $S_{x1}$ is turned off, inductor La is discharged by DC bus voltage through $S_1$ and $D_{x2}$ (the parallel diode of auxiliary switch $S_{x2}$).

(5) When current of inductor La decreases to zero, $D_{x2}$ turns off naturally and the commutation is completed.

Figure 23:
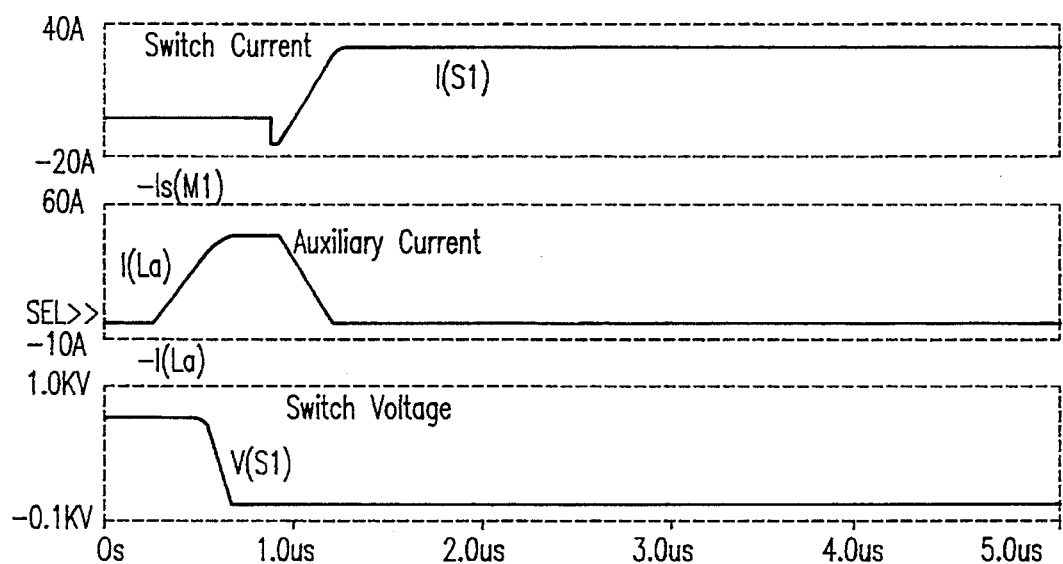
FIG. 23 is a simulation of the commutation from $D_2$ to $S_1$.

A simulation of this commutation process is shown in FIG. 23, which indicates clearly that zero voltage switching has been achieved since switch voltage decreases to zero before switch current increases. Thus, turn-on loss and reverse recovery are eliminated.

While the invention has been described in terms of a single preferred embodiment, those skilled in the art will recognize that the invention can be practiced with modification within the spirit and scope of the appended claims.

We claim:

1. A zero-voltage-transition three-phase voltage link converter, comprising:

a direct current power source;

a main switching circuit connected between said direct current power source and a three-phase alternating current output; and an auxiliary circuit connected between said direct current power source and said main switching circuit, said auxiliary circuit comprising:

at least one resonant inductor connected to at least one phase of said three-phase output;

auxiliary power supply means for discharging said resonant inductor; and switch means for switchably connecting said auxiliary circuit to said direct current power source.

2. A zero-voltage-transition three-phase voltage link converter as recited in claim 1 wherein said auxiliary power supply means is an independent power supply.

3. A zero-voltage-transition three-phase voltage link converter as recited in claim 1 wherein said auxiliary power supply means is a feedback circuit inductively coupling said resonant inductor to said direct current power supply through an inductive coupling.

4. A zero-voltage-transition three-phase voltage link converter as recited in claim 1 wherein said auxiliary power supply means is implemented with said direct current power supply connected to said resonant inductor through a pair of cross-coupled diodes.

5. A zero-voltage-transition three-phase voltage link converter as recited in claim 1 further comprising a diode bridge electrically connected between said auxiliary power supply means and said switch means.

6. A zero-voltage-transition three-phase voltage link converter as recited in claim 1 wherein said auxiliary circuit further comprises:

one resonant inductor for each phase of said three-phase output;

a plurality of auxiliary power supply means for discharging said resonant inductors; and a plurality of switch means for switchably connecting said auxiliary circuit to said direct current power source.

7. A zero-voltage-transition three-phase voltage link converter, comprising:

a direct current power source;

a main switching circuit having three pairs of power switches connected in parallel with said direct current power source, each of said pairs of power switches corresponding to one phase of a three-phase alternating current output;

an auxiliary circuit for achieving zero voltage transition in said main switching circuit, said auxiliary circuit comprising:

three pairs of auxiliary switches connected in parallel with said direct current power source, each of said pairs of auxiliary switches corresponding to one phase of said three-phase alternating current output, and each of said pairs of auxiliary switches connected to a corresponding one of said pairs of power switches with a resonant inductor.

* * * * *